United States Patent
Liu

(10) Patent No.: US 10,407,058 B2
(45) Date of Patent: Sep. 10, 2019

(54) AUTOMOBILE CORNERING ROLLOVER PREVENTION METHOD AND SYSTEM

(71) Applicant: YANCHENG INSTITUTE OF TECHNOLOGY, Yancheng, Jiangsu Province (CN)

(72) Inventor: Fuhao Liu, Yancheng (CN)

(73) Assignee: YANCHENG INSTITUTE OF TECHNOLOGY, Yancheng, Jiangsu Province (CN)

( * ) Notice: Subject to any disclaimer, the term of this patent is extended or adjusted under 35 U.S.C. 154(b) by 211 days.

(21) Appl. No.: 15/319,263

(22) PCT Filed: Jan. 12, 2016

(86) PCT No.: PCT/CN2016/070722
§ 371 (c)(1),
(2) Date: Dec. 15, 2016

(87) PCT Pub. No.: WO2016/112845
PCT Pub. Date: Jul. 21, 2016

(65) Prior Publication Data
US 2017/0151942 A1   Jun. 1, 2017

(30) Foreign Application Priority Data

Jan. 15, 2015 (CN) .......................... 2015 1 0021475

(51) Int. Cl.
*B60W 30/04* (2006.01)
*B60Q 5/00* (2006.01)
(Continued)

(52) U.S. Cl.
CPC ............ *B60W 30/04* (2013.01); *B60Q 5/005* (2013.01); *B60Q 9/00* (2013.01); *B60W 50/14* (2013.01);
(Continued)

(58) Field of Classification Search
CPC .... B60W 30/04; B60W 50/14; B60W 40/112; B60W 2030/043; B60W 2040/1315;
(Continued)

(56) References Cited

U.S. PATENT DOCUMENTS 5,925,083 A * 7/1999 Ackermann ............. B62D 6/00
                                                          180/421
6,308,126 B2 * 10/2001 Yokoyama ............ B60T 8/1755
                                                          180/197

(Continued)

FOREIGN PATENT DOCUMENTS

CN  101041320  9/2007
CN  201362249  12/2009
(Continued)

OTHER PUBLICATIONS

R. Rajannani, Vehicle Dynamics and Control, Mechanical Engineering Series, © Rajesh Rajamani 2012.*

(Continued)

*Primary Examiner* — Courtney D Heinle
(74) *Attorney, Agent, or Firm* — Rankin, Hill & Clark LLP

(57) ABSTRACT

An automobile cornering rollover prevention system comprises a speed controller, a wheel deflection measuring instrument mounted on a front wheel of the automobile, force sensors mounted on axis positions of four wheels, and an angular speed measuring instrument and a speed controller mounted on the front wheel of the automobile, and the wheel deflection measuring instrument, the angular speed measuring instrument and the force sensor are all electrically connected to the speed controller. The speed controller is connected to a brake system of the automobile, so that the speed can be intelligently reduced through the brake system. When a driver changes $\theta_1$ according to a road condition, the speed controller may calculate a critical radius in real time (Continued)

and then compare the speed and give a command in real time for controlling the speed, so that the speed is maintained in an ideal range.

7 Claims, 1 Drawing Sheet

(51) Int. Cl.
    *B60Q 9/00*         (2006.01)
    *B60W 50/14*       (2012.01)
    *B60W 40/112*     (2012.01)
    *B60W 40/13*       (2012.01)

(52) U.S. Cl.
    CPC ..... *B60W 40/112* (2013.01); *B60W 2030/043* (2013.01); *B60W 2040/1315* (2013.01); *B60W 2050/143* (2013.01); *B60W 2510/22* (2013.01); *B60W 2520/12* (2013.01); *B60W 2520/18* (2013.01); *B60W 2540/18* (2013.01)

(58) Field of Classification Search
    CPC ....... B60W 2050/143; B60W 2510/22; B60W 2520/12; B60W 2520/18; B60W 2540/18; B60Q 5/005; B60Q 9/00
    See application file for complete search history.

(56) References Cited

U.S. PATENT DOCUMENTS

| | | | | |
|---|---|---|---|---|
| 7,590,481 | B2* | 9/2009 | Lu | B60T 8/172 340/440 |
| 9,150,198 | B2* | 10/2015 | Brueggemann | B60T 7/12 |
| 2005/0143885 | A1* | 6/2005 | Nimmo | B60G 17/0162 701/38 |
| 2006/0129298 | A1* | 6/2006 | Takeda | B60T 8/17554 701/70 |
| 2007/0078581 | A1* | 4/2007 | Nenninger | B60G 17/0162 701/70 |
| 2007/0185623 | A1* | 8/2007 | Chen | B60W 30/04 701/1 |
| 2011/0190976 | A1* | 8/2011 | Goettsch | B60G 17/0162 701/31.4 |
| 2012/0010798 | A1* | 1/2012 | Ito | B60K 23/0808 701/70 |
| 2014/0081542 | A1* | 3/2014 | Yao | B60W 50/14 701/70 |
| 2017/0151942 | A1* | 6/2017 | Liu | B60W 30/04 |

FOREIGN PATENT DOCUMENTS

| | | |
|---|---|---|
| CN | 102470874 | 5/2012 |
| CN | 103381796 | 11/2013 |
| CN | 103661366 | 3/2014 |
| CN | 104590254 | 5/2015 |
| JP | 2014008886 | 1/2014 |

OTHER PUBLICATIONS

Schofield, "Vehicle Dynamics Control for Rollover Prevention," Lund University, Dec. 2006.*
Car Tech, "Finding the Car Center of Gravity/Mass," retrieved from http://www.thecartech.com/subjects/auto_eng/Center_of_Gravity.htm as of Jul. 26, 2013.*
International Search Report filed in PCT/CN2016/070722 dated Apr. 22, 2016.

* cited by examiner

AUTOMOBILE CORNERING ROLLOVER PREVENTION METHOD AND SYSTEM

TECHNICAL FIELD

The present invention relates to the field of automobile control, and more particularly, to an automobile cornering rollover prevention method and system that effectively improve the safety.

BACKGROUND

With continuous expansion of urbanization, the quantity of family cars is steadily on the increase, which leads to large-area coverage of roads. No matter an ordinary driveway or an overhead driveway has various curves. As is well known, people have a habit when driving through a curve, that is to decelerate to an ideal state and then pass through the curve slowly, and after driving out from the curve, and press an accelerator to feed oil for acceleration. It is hardly realized that this habit will increase the fuel consumption of the automobile more or less, and a brake pad may also be severely worn, which will cause a considerable expense if things continue this way. In addition, a driver is unavoidable to have visual fatigues when passing through these ways every day, and cannot correctly judge the speed to enter the curve, which leads to an excessive speed to enter the curve, so that the automobile is easy to be out of control in a cornering process, and may even roll over.

Therefore, it is an increasingly important subject to prevent the speed of the automobile from being out of control in cornering, reduce risks caused by mistaken determination, and reduce economic losses.

State Intellectual Property Office of the People's Republic of China disclosed a patent literature with a publication number of CN101041320 on Sep. 26, 2007, which was titled automobile rollover prevention safety system including a rollover prevention hydraulic pressure adjustment system and a rollover prevention circuit control system, wherein the concrete implementation solution is as follows: the rollover prevention hydraulic pressure adjustment system and a hydraulic power turning machine are together connected on a hydraulic pump in parallel, when the speed exceeds a certain value, a corresponding magnetic valve is adjusted to open and close, and a corresponding magnetic valve is adjusted to open and close during steering, so that the centre of gravity of the automobile is adjusted when steering at a high speed. According to the solution, the effect of preventing rollover is implemented during steering through adjusting the centre of gravity of the automobile, but a complicated hydraulic pressure adjustment device needs to be installed in the automobile, which occupies too large space for a compact automobile body, and has higher cost; moreover, the increased weight increases the fuel consumption and automobile abrasion, and results in a longer time delay to mechanical adjustment, is relatively difficult to adapt to a high speed driving environment, and has poor practical applicability.

SUMMARY

The present invention mainly solves the technical problems including complicated structure, high cost, insufficient practical applicability, or the like, in the prior art and provides an automobile cornering rollover prevention method and system that have good instantaneity, simple structure, convenient mounting, quick reaction speed and good control effect, and may adjust the speed anytime according to a state of the automobile.

The following technical solutions are used in the present invention to solve the technical problems above: an automobile cornering rollover prevention method includes the following steps of:

A. obtaining inherent parameters of the automobile, and measuring a centre-of-gravity position a deflection angle $\theta_1$ of a front wheel and an angular speed of the front wheel of the automobile in real time, wherein the inherent parameters of the automobile include a distance L between axes of the front wheel and a rear wheel at the same side, a distance B between axes of two front wheels or two rear wheels, and a height h of the centre-of-gravity position of the automobile from ground; defining a cornering direction of the automobile as a cornering side and defining a negative cornering direction as an opposite side; i.e., a left side being the cornering side while a right side being the opposite side if the automobile turns left; and then the right side being the cornering side, while the left side being the opposite side if the automobile turns right; wherein, a distance between the centre-of-gravity position and a connecting line of the axes of the two front wheels is b, and a distance between the centre-of-gravity position and a connecting line of the axes of the front wheel at the opposite side and the rear wheel at the opposite side is a;

B. calculating a distance between the front wheel at the cornering side and an instantaneous centre, which is $r_1 = L/\sin(\theta_1)$;

C. calculating a centre-of-gravity angle $\theta_G$ formed by the center of gravity—the instantaneous centre—the axis of the rear wheel of the automobile, wherein a calculation formula is as follows:

$$\theta_G = \tan^{-1}((L-b)/(B-a+r_1\cos(\theta_1)));$$

D. calculating a distance $r_G$ between the instantaneous centre and the centre of gravity, wherein a calculation formula is as follows:

$$r_G = \frac{L-b}{\sin(\theta_G)};$$

E. calculating a speed at the centre of gravity when the rollover is about to occur, which is $$v_G = \sqrt{\frac{r_G g a}{h\cos(\theta_G)}}$$

wherein, g is a gravity acceleration;

F. calculating a critical speed of the front wheel at the cornering side, which is $$v_1^{max} = v_G \frac{r_1}{r_G};$$

and

G. measuring a current speed of the front wheel at the cornering side through the angular speed of the front wheel, and comparing the current speed of the front wheel at the cornering side with the critical speed, reducing the speed if the current speed is larger than the critical speed, until the current speed of the front wheel at the cornering side is smaller than or equal to the critical speed; and not controlling the speed if the current speed is smaller than the critical speed.

Different deflection angles of the wheels lead to different critical speeds when the automobile is during cornering. According to the solution, the speed, the deflection angle of the wheel, and the centre-of-gravity position are measured in real time, the critical speed is calculated in real time through the deflection angle and the centre-of-gravity position, and the speed is reduced when the speed is found to be larger than the critical speed. That is, the control over the speed is started when the driver slightly rotates the steering wheel, which is a progressive process, and with the increase of a rotation angle of the steering wheel (the increase of the deflection angle of the wheel), the speed is linearly reduced naturally. The deceleration process is smooth with good instantaneity, which not only avoids the risk of rollover, but also avoids the speed being reduced too much, so that the fuel and time are saved. The driver does not need to decelerate in advance before entering the curve, which reduces the complexity of operation. From a safety aspect, in step G, the critical speed may be reduced properly before comparing, for example, 80% to 90% critical speed is compared with the current speed of the front wheel at the cornering side, and a margin of 10% to 20% is left, to ensure driving safety.

Preferably, the centre-of-gravity position is determined through a following manner:

obtaining values $F_1$, $F_2$, $F_3$ and $F_4$ of four force sensors mounted on the axis positions of the front wheel at the cornering side, the front wheel at the opposite side, the rear wheel at the opposite side and the rear wheel at the cornering side, wherein a distance a between the centre-of-gravity position and the connecting line of the axes of the front wheel at the opposite side and the rear wheel at the opposite side is obtained through a following formula:

$$a = \frac{(F_1 + F_4)B}{F_1 + F_2 + F_3 + F_4};$$

and a distance b between the centre-of-gravity position and the connecting line of the axes of the two front wheels is obtained through a following formula:

$$b = \frac{(F_3 + F_4)L}{F_1 + F_2 + F_3 + F_4}.$$

Preferably, when the current speed is detected to be larger than the critical speed, and needs to be reduced, alarming is given through an alarm, speed to remind a person in the automobile to tare care, so as to reduce the probability of collision caused by deceleration.

An automobile cornering rollover prevention system includes a speed controller, a wheel deflection measuring instrument mounted on a front wheel of the automobile, a force sensor mounted on axis positions of four wheels, and an angular speed measuring instrument and a speed controller mounted on the front wheel of the automobile, and the wheel deflection measuring instrument, the angular speed measuring instrument and the force sensor are all electrically connected to the speed controller.

The speed controller is connected to a brake system and an engine system of the automobile, and the speed may be intelligently reduced through the brake system and the engine system. The wheel deflection measuring instrument measures an deflection angle of the wheel and transmits the deflection angle of the wheel to the speed controller; The angular speed measuring instrument detects an angular speed of the wheel and transmits the angular speed of the wheel to the speed controller; and the force sensor detects a pressure value of an automobile body and transmits the pressure value of the automobile body to the speed controller. A weight of the automobile body structure under the force sensor cannot be detected, but the weight of this part is a fixed value; a and b may be amended later, and may also be used as safety margins without being considered.

Preferably, the automobile cornering rollover prevention system further includes alarm, wherein the alarm is electrically connected to the speed controller.

Preferably, the alarm includes a sound alarm and/or a light alarm, the sound alarm is mounted in a driving cab, and the light alarm is mounted on an instrument board or a steering wheel.

The sound alarm gives alarming to prompt, and the light alarm prompts through a manner of flashing or lightening.

To prevent brain fatigue caused by frequent alarming of the alarm, an alarming sensitivity is reduced. When deceleration is needed, no alarming is given if a decelerated acceleration is smaller than 2 m/s², and first-class alarming such as a simple buzz sound or flashing is given if the decelerated acceleration is larger than or equal to 2 m/s². If deceleration caused by triggering the alarm continuously occurs within five minutes, then the automobile is determined to drive in a region with more curves and the speed is excessive, and second-class alarming is given, for example, a prompt tone "your speed is possible to be higher than a current proper speed, please drive safely" is played through the sound alarm, or caution lights with different colors and/or different frequencies are emitted through the light alarm.

The present invention has the substantial effects of simple structure, convenient mounting and sensitive reaction, and may intelligently judge whether deceleration is needed; moreover, the driver may directly enter the curve without deceleration, which saves the fuel consumption and time, reduces the complexity of operation, and ensures the driving safety.

in the figures: 1 refers to wheel deflection measuring instrument, 2 refers to force sensor, 3 refers to speed controller, 4 refers to alarm, and 5 refers to angular speed measuring instrument.

DETAILED DESCRIPTION

The technical solutions of the present invention are further described in details hereunder with reference to the embodiment and drawings.

Figure 1:
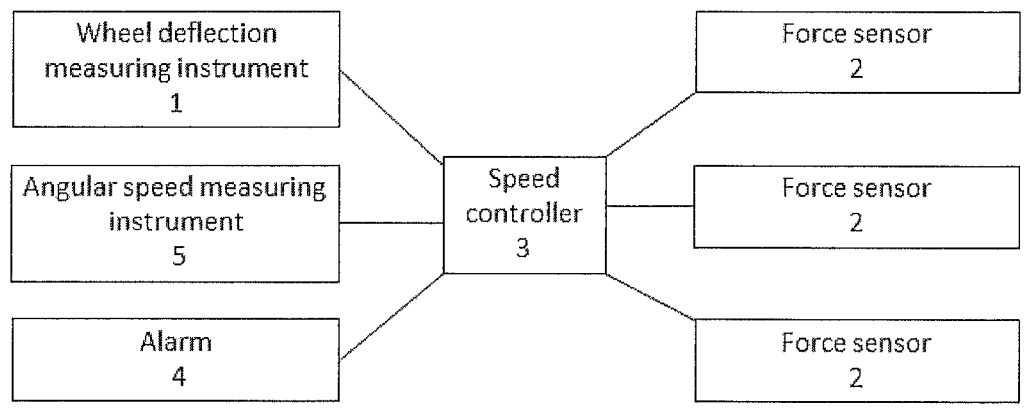
FIG. 1 is a structure diagram of an automobile cornering rollover prevention system according to the present invention.

Embodiment: An automobile cornering rollover prevention system according to the embodiment, as shown in FIG. 1, includes a wheel deflection measuring instrument 1, force sensors 2, a speed controller 3, an alarm 4, and an angular speed measuring instrument 5. The wheel deflection measuring instrument is mounted on a left front wheel of the automobile to measure a deflection angle $\theta_1$ of the left front wheel in an instantaneous cornering process of the automobile, an angular speed measuring instrument is mounted on the front wheel of the automobile to measure an instantaneous angular speed of the front wheel of the automobile, four force sensors are respectively mounted on axis positions of four wheels, and the wheel deflection measuring instrument, the force sensor, and the alarm are all electrically connected to the speed controller. The alarm includes a sound alarm and/or a light alarm, the sound alarm is mounted in a driving cab, and the light alarm is mounted on an instrument board or a steering wheel.

The speed controller is connected to a brake system of the automobile, so that the speed can be intelligently reduced through the brake system.

Figure 2:
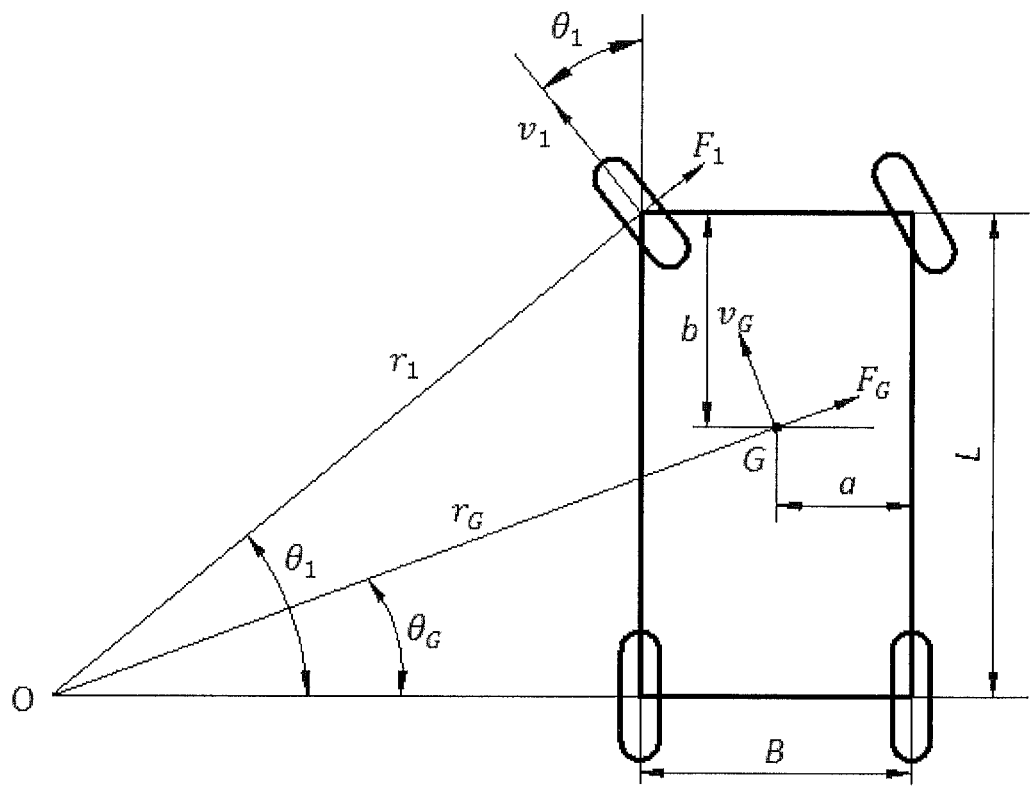
FIG. 2 is a parameter block diagram during left turning according to the present invention.

As shown in FIG. 2, the embodiment is explained by taking the automobile while turning left for example.

A value detected by the force sensor mounted on an axis of a left front wheel is $F_1$, a value detected by the force sensor mounted on an axis of a right front wheel is $F_2$, a value detected by the force sensor mounted on an axis of a right rear wheel is $F_3$, and a value detected by the force sensor mounted on an axis of a left rear wheel is $F_4$, a distance a between a centre-of-gravity position and the connecting line of the axes of the right front wheel and the right rear wheel is obtained through a following formula:

$$a = \frac{(F_1 + F_4)B}{F_1 + F_2 + F_3 + F_4};$$

and a distance b between the centre-of-gravity position and the connecting line of the axes of two front wheels is obtained through a following formula:

$$b = \frac{(F_3 + F_4)L}{F_1 + F_2 + F_3 + F_4}.$$

A height h of the centre-of-gravity position from ground is a fixed parameter.

When the automobile steers, the system needs to guarantee that each wheel simply rotates around the same centre in a rotation process, i.e., O is a speed centre; B is a distance between interactions of axial lines of key pins at two sides and the ground, i.e., a wheel base; L is an axle base of the automobile; $\theta_1$ is the deflection angle of the wheel, $r_1$ is a distance between the instantaneous centre O and the axis of the left front wheel, and G is the centre o gravity of the automobile body.

The wheel at an inner side is just to leave the ground when the automobile is just to roll over. A centripetal force $F_G$ at the centre of gravity of the automobile may be obtained according to a kinematics rule:

$$F_G = m \frac{v_G^2}{r_G} \quad (1)$$

wherein, $V_G$ is a maximum speed at the centre of gravity that can be tolerant, and $r_G$ is a distance between the instantaneous centre and the centre of gravity, which may be denoted as:

$$r_G = \frac{L-b}{\sin(\theta_G)} \quad (2)$$

wherein, $\theta_G = \tan^{-1}((L-b)/(B-a+r_1 \cos(\theta_1)))$.

By taking a connecting line between the wheel and a contact point with the ground as a rotation axis, it may be obtained through moment balance that:

$$mga = F_G h \cos(\theta_G) \quad (3)$$

It may be obtained from the formula (3), a critical speed at the centre of gravity when rollover occurs is:

$$v_G = \sqrt{\frac{r_G g a}{h \cos(\theta_G)}} \quad (4)$$

According to a kinematics theory, when the automobile rolls over, a critical speed of the wheel at the left front wheel is:

$$v_1^{max} = v_G \frac{r_1}{r_G} \quad (5)$$

wherein, the distance between the left front wheel and the instantaneous centre is $r_1 = L/\sin(\theta_1)$.

Therefore, the effect of the speed controller is: to control the rotation speed $v_1$ of the left front wheel in real time according to an allowable critical speed $v_1^{max}$ of the left front wheel calculated in real time during the driving process of the automobile, so that $v_1 < v_1^{max}$ can be implemented by the controller during cornering; therefore, the object of preventing rollover through intelligent deceleration during cornering of the automobile is achieved. When a current speed is detected to be larger than the critical speed, and needs to be reduced, alarming is given through the alarm.

The speed controller in the text above plays roles of calculating, judging, and giving commands. During cornering, a driver may judge a rotation angle $\theta_1$ of the front wheel by unaided eyes, calculate the allowable maximum rotation speed $v_1^{max}$ in the case that the automobile does not roll over according to the formula, calculate the speed $v_1$ of the left front wheel through measuring the angular speed of the left front wheel, and compare the speed $v_1$ of the left front wheel with the critical value $v_1^{max}$, so as to judge that whether the automobile is overspeed. If the automobile is overspeed, then braking interference is conducted through intelligently controlling the system, to uniformly reduce the speed to a safety range.

The system is flexible on a calculation aspect. When the driver changes $\theta_1$ according to a road condition, the speed controller may calculate a critical radius in real time and then compare the speed and give a command in real time for controlling the speed, thus both avoiding a risk of rollover due to overspeed and avoiding increase of fuel consumption due to excessive deceleration. In this way, the driver does not need to decelerate deliberately, and risks may be effectively reduced when the driver makes error judgment, so as to protect personnel safety.

The embodiment described in the text is illustrative only for the spirit of the present invention. Various amendments or supplements to the specific embodiment described may be made or similar manners may be used as replacements by those skilled in the arts of the present invention, without departing from the spirit of the present invention or exceeding the ranged defined by the claims attached.

Although the instantaneous centre, the cornering side, and other terms are frequently used in the text, the probability of using other terms is not eliminated. These terms are only used for expediently describing and explaining the essence of the present invention; and it is contrary to the spirit of the present invention to explain them into any additional restriction.

The invention claimed is:

1. An automobile cornering rollover prevention method, comprising:
   A. obtaining inherent parameters of the automobile, and measuring a center-of-gravity position, a deflection angle $\theta_1$ of a front wheel and an angular speed of the front wheel of the automobile in real time, wherein the inherent parameters of the automobile comprise a distance L between axes of the front wheel and a rear wheel at the same side, a distance B between axes of two front wheels or two rear wheels, and a height h of the center-of-gravity position of the automobile from ground; defining a cornering direction of the automobile as a cornering side and defining a negative cornering direction as an opposite side, i.e., a left side being the cornering side while a right side being the opposite side if the automobile turns left; and then the right side being the cornering side, while the left side being the opposite side if the automobile turns right; wherein, a distance between the center-of-gravity position and a connecting line of the axes of the two front wheels is b, and a distance between the center-of-gravity position and a connecting line of the axes of the front wheel at the opposite side and the rear wheel at the opposite side is a;
   B. calculating a distance between the front wheel at the cornering side and an instantaneous center, which is $r_1 = L/\sin(\theta_1)$
   C. calculating a center-of-gravity angle $\theta_G$ formed by the center of gravity—the instantaneous center—the axis of the rear wheel of the automobile, wherein a calculation formula is as follows:

$\theta_G = \tan^{-1}((L-b)/(B-a+r_1 \cos(\theta_1)))$;

D. calculating a distance $r_G$ between the instantaneous center and the center of gravity, wherein a calculation formula is as follows:

$$r_G = \frac{L-b}{\sin(\theta_G)};$$

E. calculating a speed at the center of gravity when the rollover is about to occur, which is $$v_G = \sqrt{\frac{r_G g a}{h \cos(\theta_G)}}$$

wherein, g is a gravity acceleration;
   F. calculating a critical speed of the front wheel at the cornering side, which is $$v_1^{max} = v_G \frac{r_1}{r_G}; \text{ and}$$

G. measuring a current speed of the front wheel at the cornering side through the angular speed of the front wheel, and comparing the current speed of the front wheel at the cornering side with the critical speed, reducing the speed if the current speed is larger than the critical speed, until the current speed of the front wheel at the cornering side is smaller than or equal to the critical speed; and not controlling the speed if the current speed is smaller than the critical speed.

2. The automobile cornering rollover prevention method according to claim 1, wherein the center-of-gravity position is determined through a following manner:
   obtaining values $F_1$, $F_2$, $F_3$ and $F_4$ of four force sensors mounted on the axis positions of the front wheel at the cornering side, the front wheel at the opposite side, the rear wheel at the opposite side and the rear wheel at the cornering side, wherein a distance a between the center-of-gravity position and the connecting line of the axes of the front wheel at the opposite side and the rear wheel at the opposite side is obtained through a following formula:

$$a = \frac{(F_1 + F_4)B}{F_1 + F_2 + F_3 + F_4}; \text{ and}$$

a distance b between the center-of-gravity position and the connecting line of the axes of the two front wheels is obtained through a following formula:

$$b = \frac{(F_3 + F_4)L}{F_1 + F_2 + F_3 + F_4}.$$

3. The automobile cornering rollover prevention method according to claim 1, wherein when the current speed is detected to be larger than the critical speed, and needs to be reduced, alarming is given through an alarm.

4. An automobile cornering rollover prevention system controlled using the method according to claim 1, comprising a speed controller, a wheel deflection measuring instrument mounted on a front wheel of the automobile, force sensors mounted on axis positions of four wheels, and an angular speed measuring instrument and a speed controller mounted on the front wheel of the automobile, and the wheel deflection measuring instrument, the angular speed measuring instrument and the force sensor are all electrically connected to the speed controller.

5. The automobile cornering rollover prevention system according to claim 4, further comprising an alarm, wherein the alarm is electrically connected to the speed controller.

6. The automobile cornering rollover prevention system according to claim 5, wherein the alarm comprises a sound alarm and/or a light alarm, the sound alarm is mounted in a driving cab, and the light alarm is mounted on an instrument board or a steering wheel.

7. The automobile cornering rollover prevention method according to claim 1, wherein when the current speed is detected to be larger than the critical speed, and needs to be reduced, alarming is given through an alarm, and wherein when a deceleration caused by triggering the alarm continuously occurs within a time frame, a second-class alarming is given through the alarm.

* * * * *